Dec. 16, 1969  H. Y. JENNINGS, JR., ET AL  3,483,737
APPARATUS FOR MEASURING INTERFACIAL TENSION
Filed June 25, 1968  4 Sheets-Sheet 3

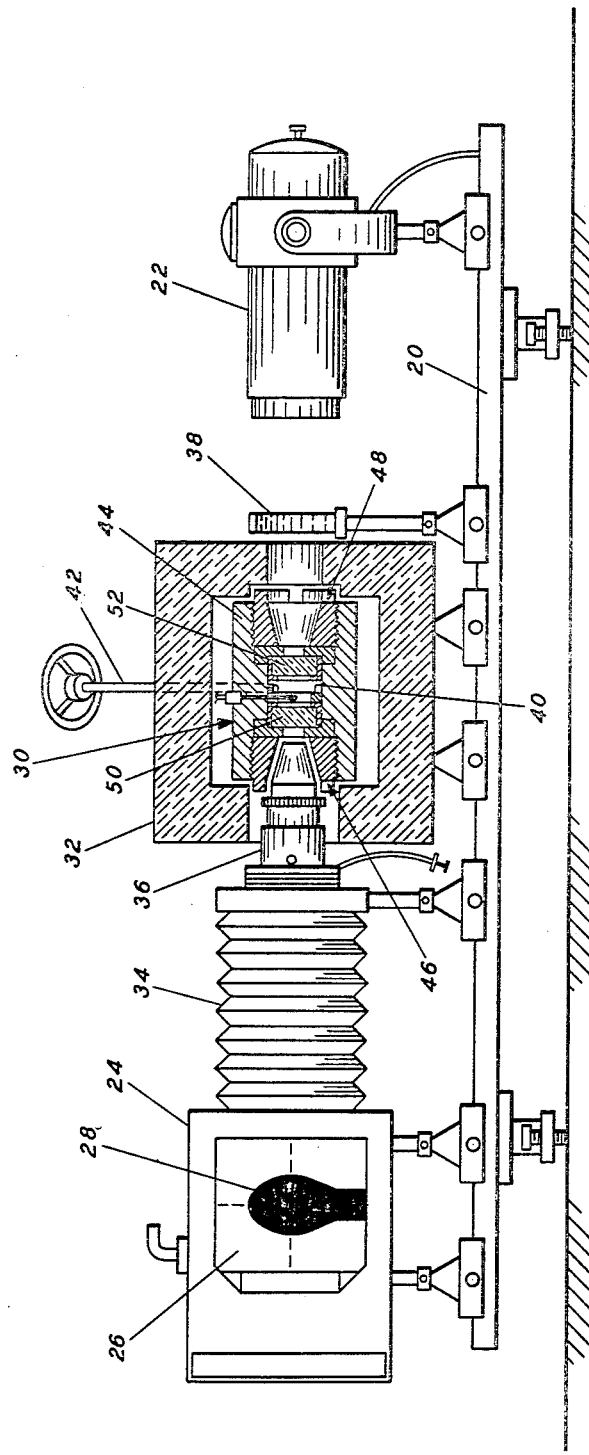

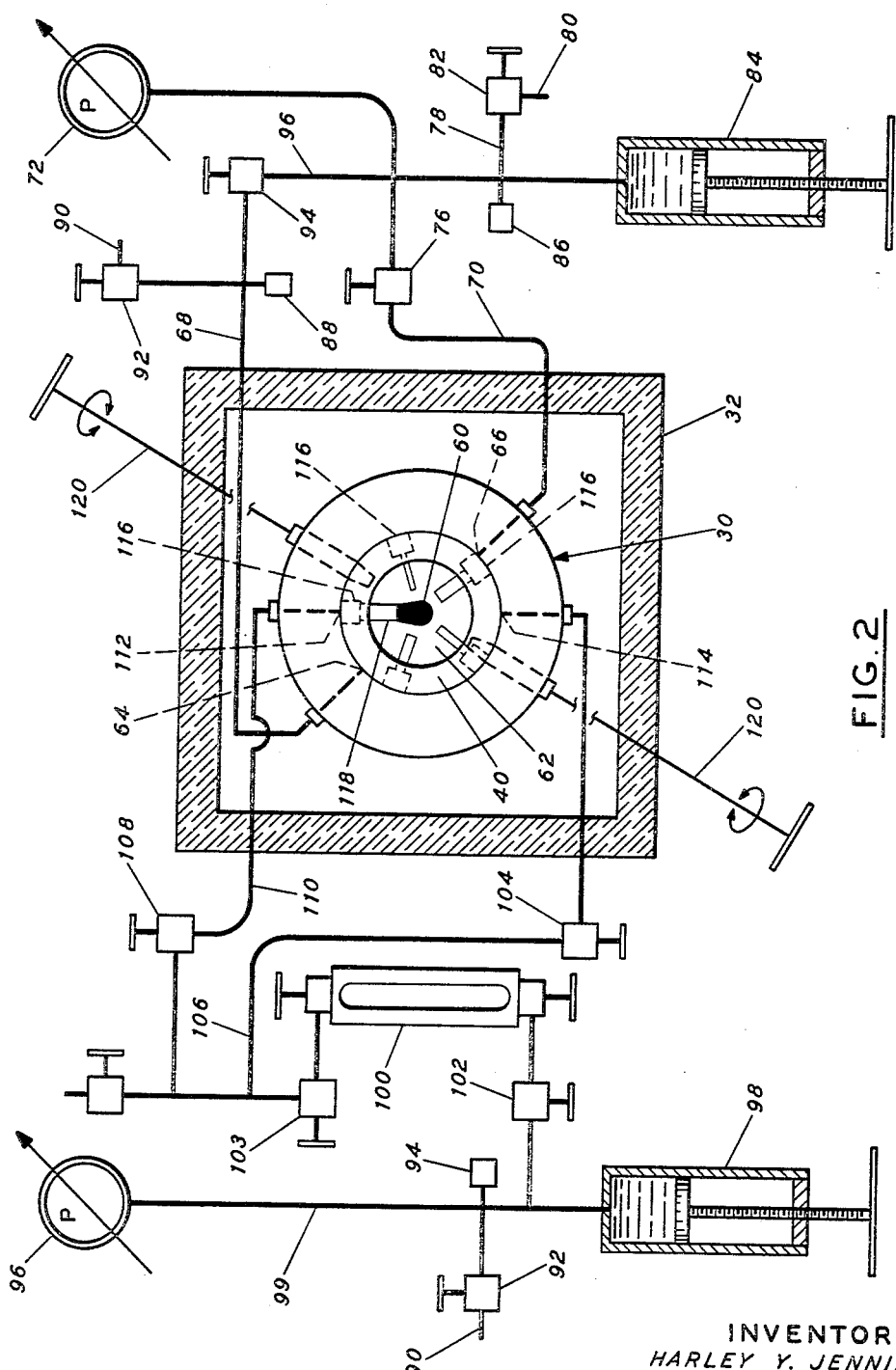

INVENTORS
HARLEY Y. JENNINGS, JR.
VOLKMAR SCHOETTLE
BY Ralph L. Freeland Jr.
Edward L. Keeling
ATTORNEYS Dec. 16, 1969  H. Y. JENNINGS, JR., ET AL  3,483,737
APPARATUS FOR MEASURING INTERFACIAL TENSION
Filed June 25, 1968  4 Sheets-Sheet 4

INVENTORS
HARLEY Y. JENNINGS, JR.
VOLKMAR SCHOETTLE
BY
ATTORNEYS

United States Patent Office 3,483,737
Patented Dec. 16, 1969

3,483,737
APPARATUS FOR MEASURING
INTERFACIAL TENSION
Harley Y. Jennings, Jr., and Volkmar Schoettle, Fullerton, Calif., assignors to Chevron Research Company, San Francisco, Calif., a corporation of Delaware
Filed June 25, 1968, Ser. No. 739,700
Int. Cl. G01n 11/02
U.S. Cl. 73—64.4                                    5 Claims

ABSTRACT OF THE DISCLOSURE

An apparatus for measuring interfacial tension by the pendent drop method having an annular ring inside a high pressure visual cell. The ring has a plurality of different size holes containing drop-forming tips which are individually alignable with the test fluid inlet. The ring is movable to align a selected drop-forming tip of a size determined by the fluid to be tested with the fluid inlet. As the drop forms in the pressure cell, it is photographed in silhouette and the boundary tension is calculated from the drop dimensions and density relationships.

Figure 4:
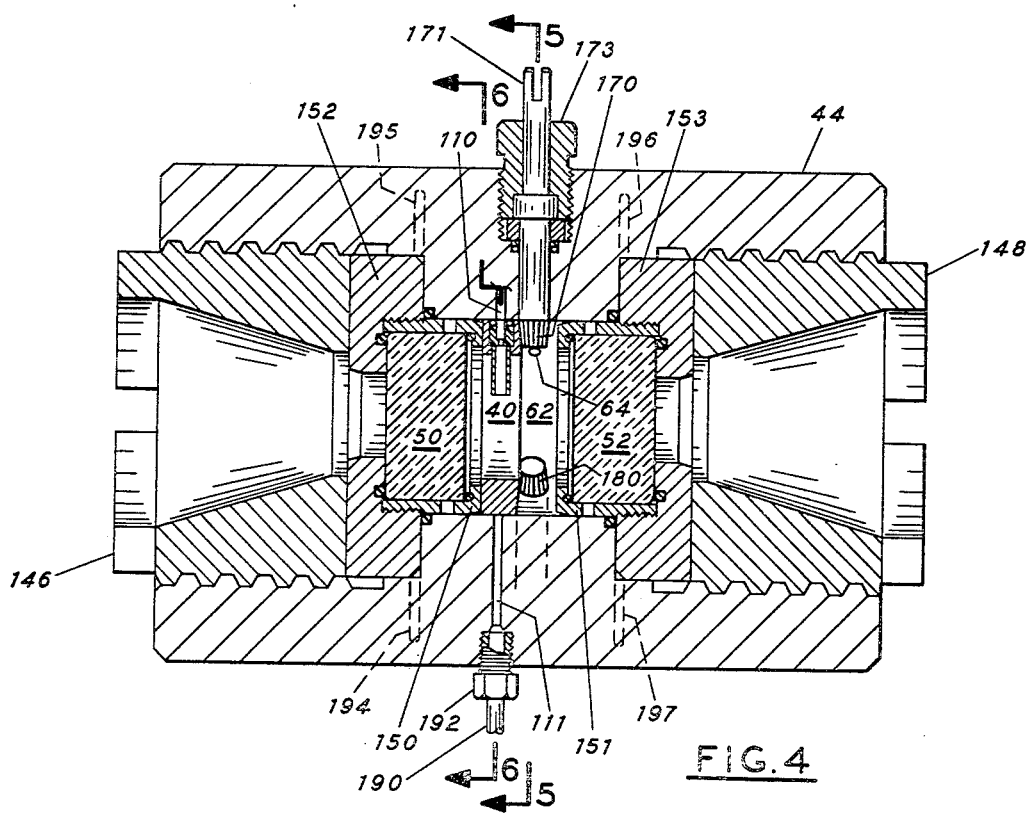

This invention provides apparatus for measuring interfacial tensions of fluid systems by the pendent drop method and, more particularly, this invention provides apparatus for use in the pendent drop method including an annular ring member having holes adapted to contain drop-forming tips, said ring member adapted to be contained in a high pressure visual cell and moved about therein to selectively align the drop-forming tips with drop liquid entry means in the high pressure visual cell.

Background of the invention

In the recovery of oil from petroleum bearing formations many sophisticated oil recovery methods based on surface chemistry are now being evaluated. In order to perform this evaluation, a knowledge of the effects of temperature and pressure on the interfacial tension of typical hydrocarbon-water and hydrocarbon-gas systems found in reservoir capillaries must be obtained. However, accurate measurement of liquid-liquid and liquid-gas boundary tensions have been difficult to obtain. Among the known methods of measuring equilibrium interfacial tension is the pendent drop method. This method has attained prominence in recent years particularly for very low values of interfacial tension. The pendent drop method is based on the forming of a drop of fluid on a tubular tip at selected pressures and temperatures while both the tip and the drop of fluid are immersed in an immiscible bulk fluid. Drop stability is maintained by keeping the drop size slightly below that which would spontaneously detach itself from the tip because of gravity or buoyancy. The drop and the tip are photographed in silhouette and the boundary tension is calculated from certain drop dimensions and density relationships.

Heretofore the apparatus used to obtain the above described data included a high pressure visual cell containing a drop-forming tip. When a different tip was required, it was necessary to break down the high pressure cell, remove the tip and to insert a new tip. In operations where the pressure range may be from 1 to 817 atmospheres with concurrent temperatures of from 25° to 176° Centigrade, the continual changing of tips in such a manner is a serious problem. Apparatus used in the pendent drop method has heretofore been discussed by Andreas, Howser and Tucker in the Journal of Physical Chemistry 42, 1001 (1938) and Harley Y. Jennings, Jr. in the Review of Scientific Instruments 28, No. 10, 774–777 (1957).

Brief description of present invention

Briefly, the present invention is directed to an improved pendent drop apparatus, which apparatus includes a high pressure visual cell having means for injecting a bulk fluid therein and means providing for drop fluid entry therein. A movable member such as an annular ring member is placed inside of the high pressure visual cell. The ring member has a plurality of holes formed in its walls and these holes are individually alignable with the drop fluid entry means in the visual cell. Drop-forming tips are connected in the holes and extend into the pressure chamber of the visual cell. When a selected hole in the ring member is aligned with the drop-forming entry means in the visual cell, a drop can be formed on the tip in the pressure chamber of the visual cell. Motive means are provided for moving the ring member to selectively align each of the holes and the tip contained therein with the drop fluid entry means.

Objects and brief description of drawings

Figure 3:
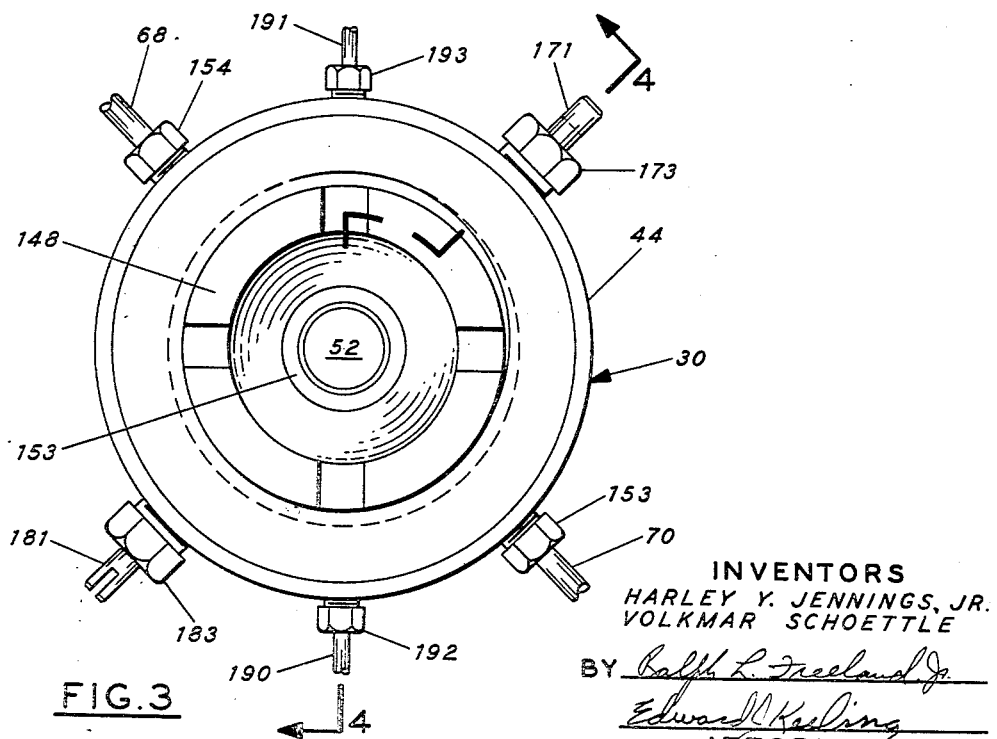
Figure 5:
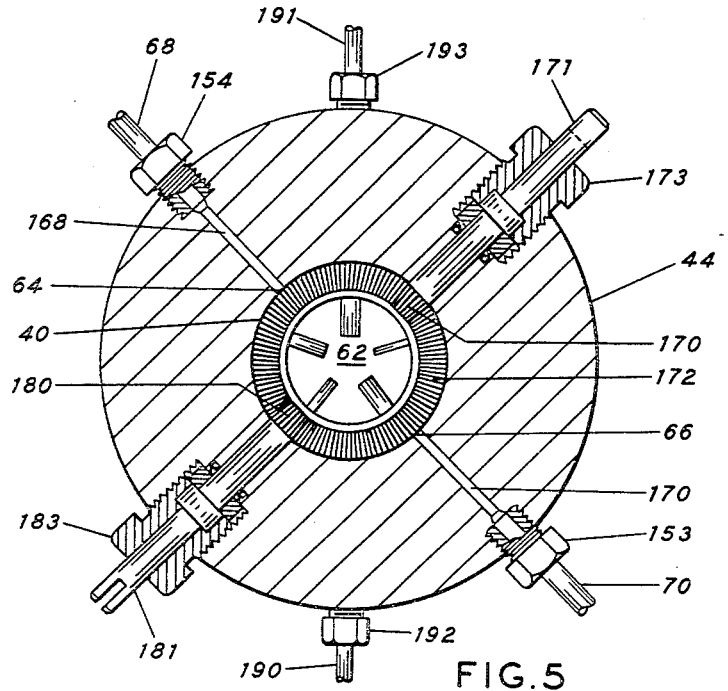
Figure 6:
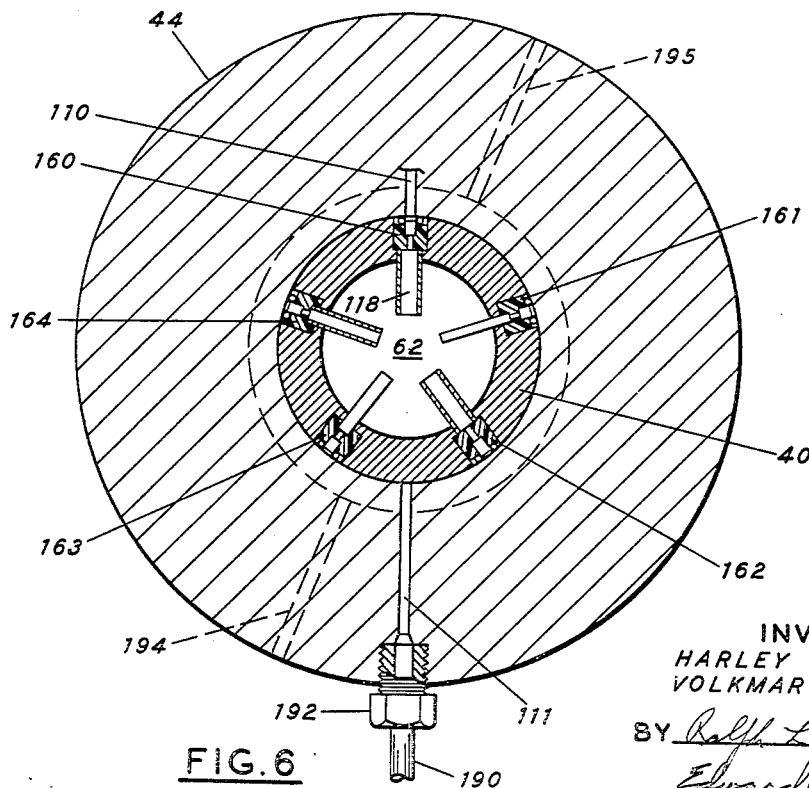

A particular object of the present invention is to provide a pendent drop apparatus which includes a plurality of drop-forming tips located in a high pressure visual cell, which tips may be selectively used to form drops in the pressure chamber of the visual cell under operating conditions of pressure and temperature. Further objects and advantages of the present invention will become apparent when the following detailed description of the invention is read in light of the accompanying drawings which are made a part of this application and in which FIGURE 1 is an elevational view, with parts broken away for clarity of presentation, illustrating pendent drop apparatus assembly in accordance with the present invention. FIGURE 2 is a schematic view of apparatus assembly in accordance with the present invention. FIGURE 3 is an end view of a high pressure visual cell section of pendent drop apparatus containing an annular ring member useful to provide interchangeable tips. FIGURE 4 is section 4—4 of FIGURE 3, FIGURE 5 is a section 5—5 of FIGURE 4 and FIGURE 6 is section 6—6 of FIGURE 4.

Detailed description of preferred embodiment of invention

The preferred embodiment of apparatus assembled in accordance with the present invention will now be discussed in detail in view of the accompanying drawings. With reference to FIGURE 1, pendent drop apparatus is illustrated. Basically, the pendent drop apparatus of the present invention provides for directing a light source through a high pressure-high temperature visual cell in which a drop of fluid of interest has been formed to cause an image of such drop to be formed on the other side of the visual cell. Calculations based on the geometry of the image may then be made to obtain specific properties of the fluid under various conditions of temperature and pressure. To accomplish this result, the various elements of the apparatus are preferably carried on a suitable frame 20 which allows for adjustment of the elements.

A high pressure-high temperature visual cell 30 is mounted on the frame 20 by suitable means. As is known in the art, a visual cell includes a pressure chamber formed by walls which have portions formed of transparent material so that light may pass through at least part of the pressure chamber. Since temperature control is necessary, the visual cell 30 is mounted within a heat chamber 32. The high pressure visual cell 30 is formed of a housing member 44 having a central opening. Suitable end closure means indicated as 46 and 48 close the central opening of the housing member 44 and capture the transparent walls 50 and 52 in a manner to provide a closed chamber within the housing which light from the illuminator 22 can pass to camera 24. The illuminator 22 provides light, and the camera 24 having a ground glass screen 26 for forming a drop image 28 are aligned on opposite sides of the transparent opening of the visual cell 30. The camera is arranged with suitable adjustable bellows means 34 and lens arrangement 36 so that focusing may be easily accomplished. A heat absorption cell 38 is preferably provided adjacent the visual opening in the heat chamber 32 to assist in temperature control. As will be discussed in more detail below, the high pressure visual cell 30 contains an annular ring member 40 having a plurality of drop-forming tips which ring member is movable within the high pressure visual cell 30 by suitable means so that tips for forming drops may be changed while the visual cell is under high pressure-high temperature conditions.

FIGURE 2 schematically illustrates apparatus assembled in accordance with the present invention. In the pendent drop method a bulk fluid is first introduced into the pressure chamber 62 of the visual cell 30. This chamber 62 is held at selected conditions of pressure and temperature while a drop-forming fluid is introduced into the bulk forming fluid in the pressure chamber 62. A drop 60 is formed within the pressure chamber 62 which contains the bulk fluid. A charge system for introducing bulk fluid into the pressure chamber of the visual cell is schematically illustrated in FIGURE 2. An entry port 66 for bulk fluid is provided in the wall of the visual cell to provide communication into the pressure chamber 62. An exit port 64 is also formed in the visual cell for removing bulk fluid from the pressure chamber 62. Tubing 70 connects the entry port 66 with a hand-operated pressure source 84 through valve 76. The pressure level of pressure source 84 is read on pressure gauge 72. Bulk fluid is flowed into the pressure chamber 62 and pressure source 84 through tubing 78 from bulk fluid source 80. A suitable shut-off valve 82 is provided in the bulk fluid supply line. Bulk fluid is removed from the pressure chamber through tubing 68 which is connected to exit port 64. Suitable relief valve 88 is connected on tubing 68 which leads to a vacuum source 90. The vacuum source is controlled by valve means 92. Valve 94 and tubing 96 permit reverse flow of the bulk fluid if desired.

A charging system for introducing drop-forming fluid is arranged to selectively provide for introducing the drop-forming fluid downwardly or upwardly into the pressure chamber 62 depending upon the relative specific gravities of the drop-forming fluid and the bulk fluid. A source of drop-forming fluid enters the drop charging system at 90 and is controlled by a suitable valve 92. An alternate source for fluid under pressure is sample pressure vessel 100 attached through suitable valves 102 and 103. With the sample pressure vessel as a source, mercury is used as the drive fluid in pressure source 98. Pressure relief valve 94 is positioned on tubing 99 of the drop charging system between pressure source 98 and visual cell 30. The pressure level of pressure source 98 is read on pressure gauge 96. The drop-forming fluid is introduced into the pressure chamber 62 in a downward direction through suitable shut-off valve 108. The drop is introduced into the pressure chamber 62 in an upward direction through valves 104 and tubing 106. Drop-forming fluid entry means are provided through visual cell 30 to ring member 40 as indicated at 112 and 114. The annular ring member 40 is adapted to be placed inside the high pressure visual cell 30. The pressure chamber 62 within the high pressure cell includes the interior of the annular ring member 40. A plurality of holes 116 are provided in the ring member 40. Suitable drop-forming tips such as, for example, drop-forming tip 118 are arranged in these holes and extend into the pressure chamber 62. The ring member 40 is rotatable within the high pressure cell 30 to selectively align a drop-forming tip with one of the drop-forming entry means. For example, drop-forming tip 118 positioned within hole 116 of ring member 40 is shown aligned with drop-forming entry means 112 in FIGURE 2. When so aligned, a drop 60 may be formed by activating the drop charging system. Means such as rotating device 120 are provided to rotate the annular ring member 40 within the high pressure cell 30 while the cell is at conditions of elevated temperature and pressure.

Referring now to FIGURES 3 through 6 inclusive, the preferred ring member arrangement within a high pressure visual cell will be discussed in greater detail. FIGURE 3 is an end view of the high pressure-high temperature cell such as the visual cell 30 schematically illustrated in FIGURE 1. The cell includes a housing member 44 having a central opening formed therein. A high pressure chamber 62 is formed interiorly of member 44 by sealing off the open ends of the member 44. The ends are formed at least in part of transparent material so that light can pass through the high pressure chamber. Thus a pair of cap members 146 and 148 having central openings are threadably engaged into the housing member 44. A pair of window sections 50 and 52 are held at the inner ends of each of the cap members 146 and 148 by means of a disc member 152 and 153, respectively, engaging into capture members 150 and 151. Suitable O-rings are used to provide a pressure-tight seal so that pressure chamber 62 may hold fluid at high pressures.

The bulk liquid is injected into pressure chamber 62 through tubing 70 and passage 170 through the wall 44 of the visual cell. Tubing 70 is connected to the exterior of the visual cell by an appropriate fitting 153. Bulk liquid may be withdrawn from pressure chamber 62 through port 64 and passage 168 to tubing 68 which is connected to the visual cell by an appropriate fitting 154.

An annular ring member 40 is contained within the cylindrical pressure chamber 62 in a manner so that the ring member may be rotated. The ring member 40 is provided with a plurality of holes into which drop-forming tips 118 are fitted. The drop-holding tips extend into the interior of the annular ring which forms a part of the high pressure chamber. Each of the holes, and thus each of the drop-forming tips is selectively alignable with a drop-forming liquid entry port means. Thus passages 110 and 111 form top and bottom drop liquid entry means through the member 44 of the visual cell and each of the tips may be aligned with the entry means by rotating ring member 40. One side of the ring member is slidably abutted against one of the transparent end walls and the other side of the ring member is provided with ring gear configuration.

The drop-forming liquid is introduced into pressure chamber 62 through suitable passage in the wall of the pressure cell which can be aligned with one of the holes in the ring member. As heretofore mentioned, ring turret 40 is provided with a plurality of spaced apart holes in which a drop-forming tip such as tip 118 has been positioned. The drop-forming tip extends into the high pressure chamber and as illustrated in FIGURE 6, the various drop-holding tips are selectively alignable with the drop-forming liquid entry port. The drop fluid supply tubes 190 and 191 are connected to the visual cell by suitable fittings 192 and 193. Bleed ports 194–197 are provided in the cell body 44 so that air in chamber 62 can be bled off as the transparent ends are sealed off. After sealing of the ends the bleed ports are closed.

Each drop-holding tip is sealed in fluid tight relationship with the interior wall of member 44 by suitable O-ring means 160–164 inclusive. The O-rings extend against the inner wall in a manner so that the annular ring member floats on the O-rings. Thus the annular ring which slidably engages against the end wall of the cell and floats on the radially spaced apart O-rings on the interior wall of the housing member 44, may be rotated by a suitable rotating means to align the various tips with the drop-forming entry port. Such a rotating means is formed by a ring gear 172 and pinion arrangement and includes a pinion gear 170 having a shaft 171 extending through high pressure body member 44. The shaft 171 is rotatably secured to the high pressure cell by a suitable connecting nipple 173. The pinion gear 170 engages the ring gear 172 formed on one side of annular ring 40. For the sake of stability under high pressure and temperature, it is preferred to have a pair of pinion gears in opposing alignment for simultaneous use in rotating annular ring 40. Thus a second pinion gear 180 having a shaft 181 rotatable in a suitable nipple connector 183 is also preferably used. With this arrangement, the annular ring may be rotated to carry a selected tip to a desired drop-forming fluid entry means while the cell is at high conditions of pressure and temperature.

While a specific embodiment of apparatus of the present invention has been discussed in detail, the invention is not to be limited to such a specific embodiment.

We claim:
1. In pendent drop apparatus which apparatus includes a high pressure visual cell, means for injecting bulk fluid into said visual cell and means providing for drop fluid entry into said visual cell, the improvement comprising a movable member adapted to be placed inside of said high pressure visual cell, a plurality of holes in said movable member individually alignable with the drop fluid entry means into said visual cell and means for moving said movable member to selectively align the holes in said movable member with the said drop fluid entry means to permit entry of drop fluid into said visual cell.

2. In pendent drop apparatus which apparatus includes a high pressure visual cell, means for injecting bulk fluid into said visual cell and means providing for drop fluid entry into said visual cell, the improvement comprising an annular ring member adapted to be placed inside of said high pressure visual cell, a plurality of holes in said ring member individually alignable with the drop fluid entry means into said visual cell and means for moving said ring member to selectively align the holes in said ring member with the said drop fluid entry means.

3. Apparatus of claim 2 further characterized by a drop-forming tip positioned in each of said holes and extending into said visual cell.

4. Apparatus of claim 2 further characterized in that the holes are radially extending through said ring member and that the ring member is rotated to selectively align said holes and said drop entry means.

5. Apparatus for measuring interfacial tension comprising a high pressure visual cell, a pair of opposing drop fluid entry means in said visual cell, pressure means for supplying drop fluid to said drop entry means, bulk fluid entry means in said visual cell, means supplying bulk fluid under pressure to said bulk fluid entry means, a ring member positioned inside of said visual cell, a plurality of radial extending co-planar holes formed in said ring member, said holes being individually alignable with each of said drop fluid entry means, a drop-forming tip in each of said holes having one end extending into said visual cell, O-ring means on the other end of each of said drop-forming tips and extending out of said ring member to provide a cushion between said ring member and said visual cell and means for rotating said ring member within said visual cell to selectively individually align said drop fluid entry means and the holes in said ring member.

References Cited

UNITED STATES PATENTS 2,473,553   6/1949   Stokes _____ 73—64.4

FOREIGN PATENTS 159,062   11/1963   U.S.S.R.
175,713   12/1965   U.S.S.R.

OTHER REFERENCES

A Pendent-Drop Apparatus for Surface and Interfacial Tensions, in Journal of Scientific Instruments, 27, pp. 67–69, March 1950.

LOUIS R. PRINCE, Primary Examiner

J. W. ROSKOS, Assistant Examiner